OPERATING MECHANISM FOR MULTIPOLE ELECTRICAL CIRCUIT BREAKER

Filed Dec. 21, 1962 7 Sheets-Sheet 1

Inventors.
William H. Woods
Robert E. Dietz
By: Paul J. Rose atty.

INVENTORS
William H. Woods
BY: Robert E. Dietz
Paul J. Rose
Atty.

INVENTORS
William H. Woods
BY: Robert E. Dietz
Paul J. Rose
Att'y.

Dec. 7, 1965 W. H. WOODS ETAL 3,222,475

OPERATING MECHANISM FOR MULTIPOLE ELECTRICAL CIRCUIT BREAKER

Filed Dec. 21, 1962 7 Sheets-Sheet 4

INVENTORS
William H. Woods
Robert E. Dietz
BY: Paul J. Rose
Atty.

INVENTORS
William H. Woods
Robert E. Dietz
By: Paul J. Rose
Atty.

Dec. 7, 1965 W. H. WOODS ETAL 3,222,475

OPERATING MECHANISM FOR MULTIPOLE ELECTRICAL CIRCUIT BREAKER

Filed Dec. 21, 1962 7 Sheets-Sheet 6

INVENTORS
William H. Woods
BY: Robert E. Dietz
Paul J. Rose
Atty.

Dec. 7, 1965 W. H. WOODS ETAL 3,222,475

OPERATING MECHANISM FOR MULTIPOLE ELECTRICAL CIRCUIT BREAKER

Filed Dec. 21, 1962 7 Sheets-Sheet 7

INVENTORS
William H. Woods
BY: Robert E. Dietz
Paul J. Rose
Atty.

3,222,475
OPERATING MECHANISM FOR MULTIPOLE ELECTRICAL CIRCUIT BREAKER

William H. Woods and Robert E. Dietz, Cedar Rapids, Iowa, assignors to Square D Company, Park Ridge, Ill., a corporation of Michigan Filed Dec. 21, 1962, Ser. No. 246,522
10 Claims. (Cl. 200—88)

This invention relates to circuit breakers and is more particularly directed to circuit breakers of the type including magnetically responsive means for tripping the circuit breaker upon the occurrence of a heavy current overload, or short circuit condition, and thermally responsive means for tripping the circuit breaker upon the occurrence of a persistent overload current of lesser magnitude.

In general, a circuit breaker of the type with which the present invention is concerned comprises a pair of separable contacts, an over-center spring type operating mechanism for opening and closing the contacts, and a current responsive tripping mechanism for releasably latching the operating mechanism. The tripping mechanism functions magnetically to release the operating mechanism substantially immediately upon the occurrence of a heavy current overload, or thermally to release the operating mechanism after a predetermined interval of time in response to a continued moderate current overload.

In former constructions, a separate blade carrier was provided having the contact blade resiliently mounted thereon to provide for overtravel. In a circuit breaker constructed in accordance with the present invention, the separate blade carrier has been omitted, thus reducing the mass that must move, the impact force, and the contact bounce, and the provisions for overtravel have been located closely adjacent the pivot of the blade, which further reduces the effective mass at the end of the blade carrying the movable contact.

In prior devices, if a pair of contacts became welded together, it was still possible for the handle to be moved to and to remain in an "off" position. Thus, the position of the handle could indicate that the contacts were open, whereas in reality they were welded closed and an unsafe condition prevailed. According to this invention, a circuit breaker has been provided wherein if the contacts are welded together, neither will the handle remain in the "off" position if moved thereto and released, nor will the handle move to an intermediate or trip-indicating position upon automatic operation of the tripping mechanism. Thus, the position of the handle in a circuit breaker constructed in accordance with the present invention always indicates the true condition of the contacts.

In a multipole circuit breaker, it is desirable that the contacts of the different poles open at the same time. To compensate for manufacturing variations, various methods have been used to accomplish this result, such as specially forming the movable blades after assembly, adjusting the carriers of the movable blade assemblies, and shimming the stationary contacts. These methods are expensive, and in accordance with the present invention, the result is accomplished by provision of an inexpensive adjusting means for the stationary contacts of each pole.

In former circuit breakers, calibration of the magnetic trip means required considerable time, because adjustment of the air gap between the armature and core also changed the length of the armature return spring and the force exerted thereby. The problem was compounded in multipole circuit breakers having a common trip bar. In accordance with the present invention, a circuit breaker is provided wherein adjustment of the air gap in the magnetically responsive portion of the tripping mechanism does not change the force exerted by the armature return spring.

Further in accordance with the present invention, a circuit breaker is provided which has an improved latching means for the tripping mechanism, whereby the pressure at the latching surfaces is reduced and consequently both the magnetically and thermally responsive portions of the tripping mechanism may be designed to exert smaller forces.

As stated before, in a multipole circuit breaker, it is desirable that the contacts of the different poles open at the same time. This is to avoid concentration of arcing which would occur at the contacts of one pole should it open before the contacts of the other poles. Also, the contact pressures in the different poles should be substantially equal and relatively high to avoid excessive contact temperatures and resulting nuisance tripping by the thermally responsive portion of the tripping mechanism. Therefore, the crossbar operatively connecting the contact blades of the different poles should be rigid. Formerly, a common type of crossbar has been a steel rod of square cross section enclosed in insulation molded thereon, and the contact blade carriers had to be tightly clamped thereto. This assembly required great care and strict following of a carefully developed technique. In accordance with the present invention, a circuit breaker having a less expensive and more rigid crossbar is provided.

Accordingly, an object of the invention is to provide an improved circuit breaker.

Another object is to provide a circuit breaker having a movable contact assembly including a pivotable blade, operating mechanism therefor, and overtravel means accommodating overtravel of the operating mechanism, the overtravel means being located closely adjacent the pivot of the blade to reduce contact bounce and thus reduce arcing between the contacts.

A further object is to provide a circuit breaker wherein the position of the handle gives a true indication of whether the contacts are open or closed, the handle being unable to remain in "off" position or to be moved automatically to "tripped" position when the contacts are welded shut.

Yet another object is to provide a circuit breaker having improved means for adjusting the pressure between contacts.

A still further object is to provide a circuit breaker having improved means for adjusting the air gap between the armature and core of the magnetically responsive portion of the tripping mechanism.

Still another object is to provide a circuit breaker having an improved latching means for the trip mechanism.

Another object is to provide a multipole circuit breaker having an improved crossbar operatively connecting the movable blades of the separate poles together for operation as a unit.

Other objects and advantages will appear when the following specification is considered along with the accompanying drawings in which:

FIGURE 1 may be considered a top view of a multiple circuit breaker constructed in accordance with this invention, the operating handle thereof being shown in an "on" position;

Figures 1, 2, 3:
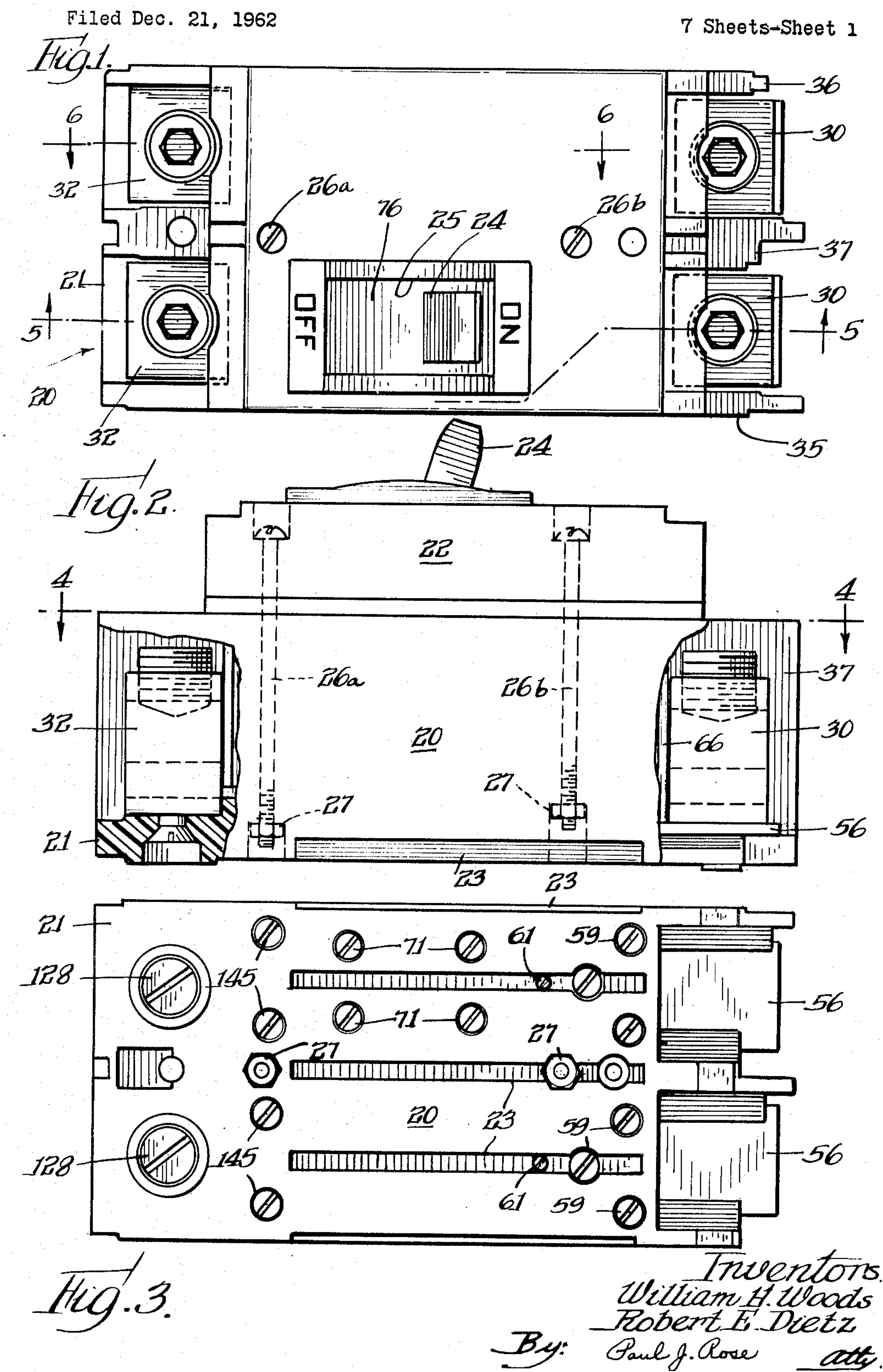
FIGURE 2 is a side elevational view of the circuit breaker of FIGURE 1, with portions broken away.
FIGURE 3 is a bottom view of the circuit breaker of FIGURE 1.

For exemplary purposes, the invention is shown and described with particular reference to a two-pole circuit breaker, although it will be obvious that various aspects of the invention are equally applicable to circuit breakers of a different number of poles. As shown in FIGURES 1–3, a circuit breaker constructed in accordance with this invention includes a base 20, a cover 22, and an operating handle 24, all preferably molded of an insulating material. The cover 22 may be held to the base 20 by a pair of bolts or screws **26*a* and 26*b* which respectively threadedly engage a pair of nuts 27 held in hexagonal recesses in the bottom of the base. The cover has an opening 25 for receiving the outer end of the handle 24 and is provided with suitable "on" and "off" indicia. A pair of electrical connectors or line terminals 30, one for each pole, is provided adjacent one end of the base 20, and a pair of electrical connectors or load terminals 32, one for each pole, is provided adjacent the other end of the base 20**, these connectors being adapted to receive line and load wires, respectively.

Figure 4:
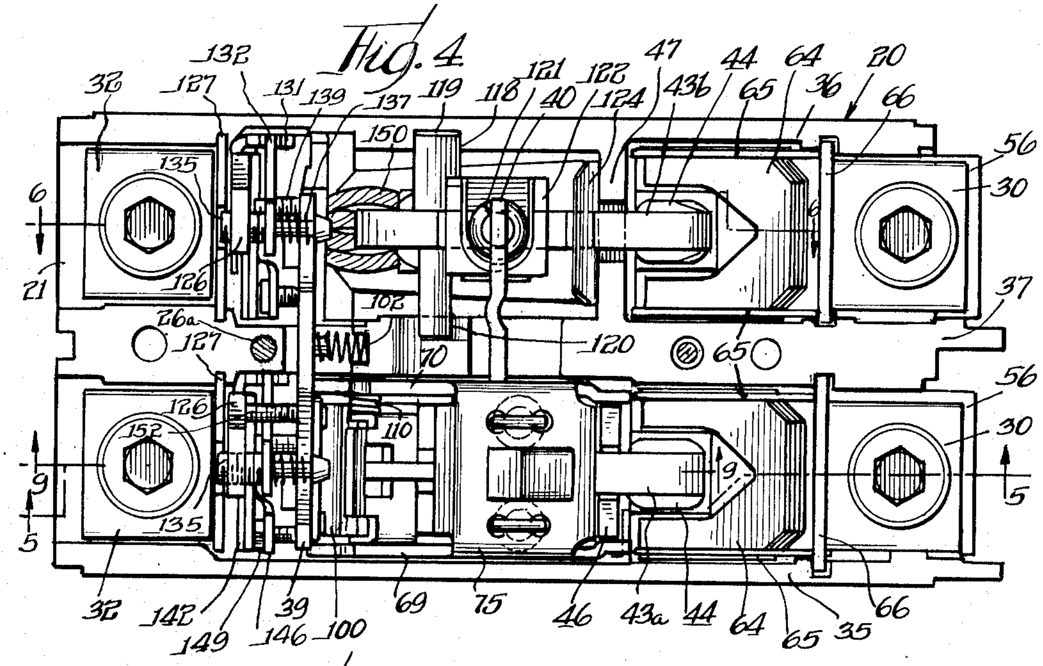
FIGURE 4 is a top view of the circuit breaker with the cover and handle removed as indicated by line 4—4 of FIGURE 2.
Figures 6, 7, 8:
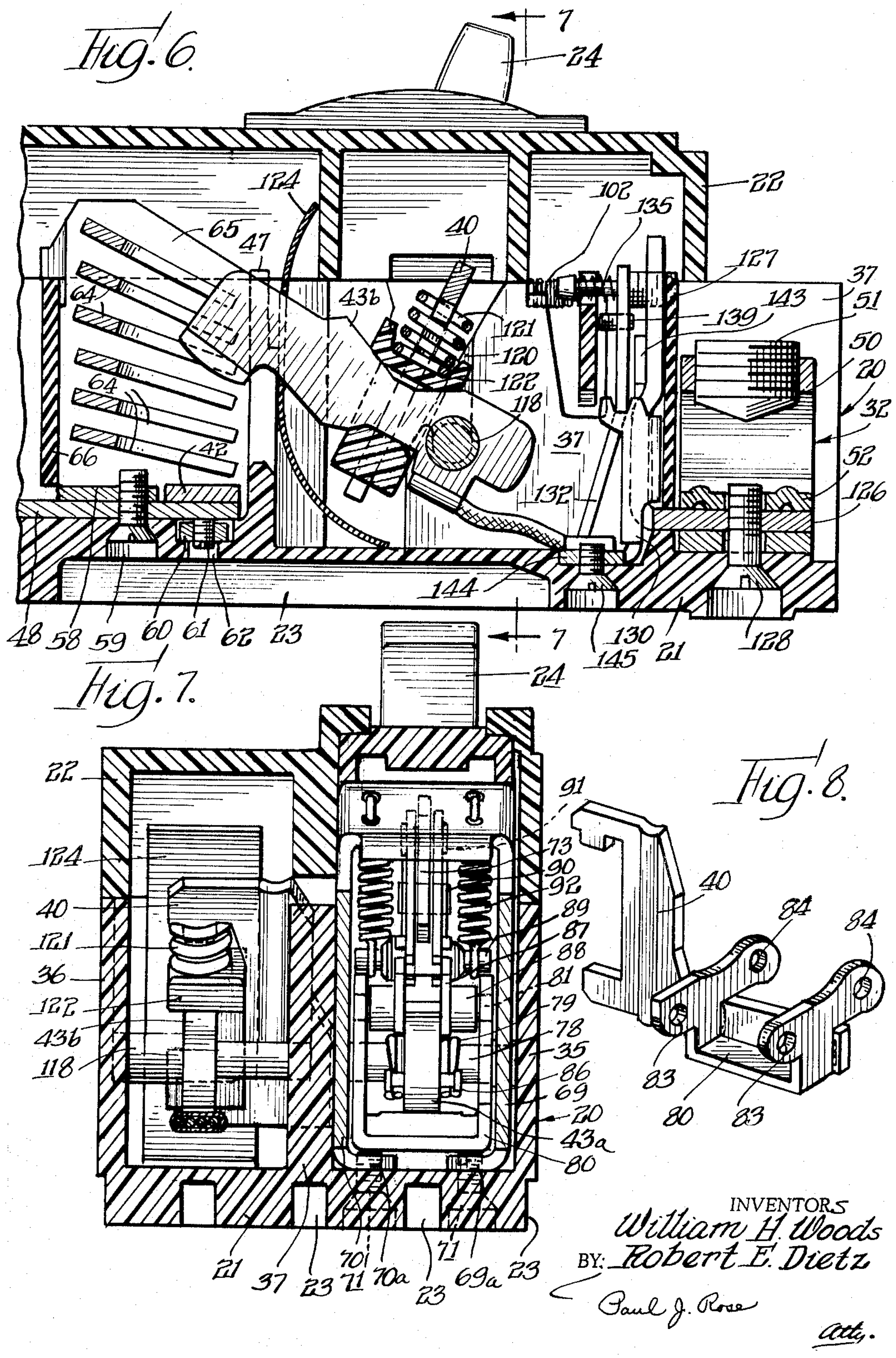
FIGURE 6 is a sectional view taken substantailly along line 6—6 of FIGURES 1 and 4 and showing the parts of the other pole in an "off" position.
FIGURE 7 is a sectional view taken substantially along line 7—7 of FIGURE 6.
FIGURE 8 is a perspective view of the blade crossbar and carrier assembly of the circuit breaker of FIGURE 1.
Figure 11:
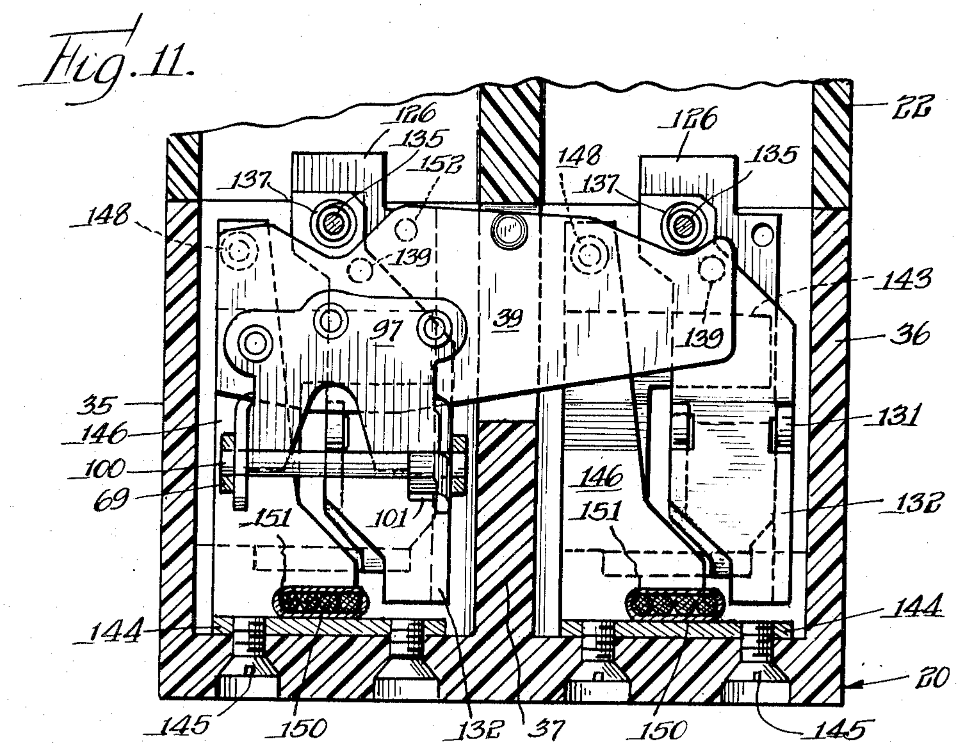
FIGURE 11 is a sectional view taken substantially along the line 11—11 of FIGURE 9.

The base 20 includes a bottom or base wall portion 21 from which a pair of opposed parallel solid side walls 35 and 36 and an intermediate wall 37, best shown in FIGURES 4, 7, and 11, extend perpendicularly. The intermediate wall 37 generally separates the two poles but is upwardly recessed in two places to provide clearance respectively for a common trip bar 39 and a blade crossbar 40 extending between the two poles and described hereinafter. The screws 26 extend perpendicularly to the bottom portion 21 through the intermediate wall 37. The bottom portion 21 may be provided with a plurality of slots 23 for receiving insulating spacers (not shown) of a panelboard designed for use with smaller circuit breakers, the two outer slots being half the width of the three inner slots.

The two poles respectively include a pair of stationary contacts 42, a pair of movable contact blades **43*a* and 43*b*, and a pair of movable contacts 44 carried respectively on the ends of the blades 43*a* and 43*b* and respectively engageable with the stationary contacts 42. The side walls 35 and 36 are respectively connected to the intermediate wall 37 by a pair of partitions 46 and 47 which are upwardly receessed to receive the outer end portions of the contact blades 43*a* and 43*b***, respectively.

The stationary contacts 42 are respectively secured as by brazing to the inner ends of a pair of bronze terminal straps 48 having the line terminals 30 respectively secured to the outer ends thereof. The line termnials 30 and load terminals 32 are preferably designed to accept both copper wire and aluminum wire in accordance with the teachings of copending application, Serial No. 188,614, filed on April 13, 1962, and assigned to the assignee of the present invention, said copending application being a continuation of application, Serial No. 821,307, filed on June 18, 1959, now abandoned, and thus respectively include apertured aluminum bodies 50, clamping screws 51, and aluminum shoes 52 interposed between the ends of the bronze terminal straps 48 and the ends of conductors (not shown) inserted in the bodies 50 of the terminals for clamping by the screws 51. A pair of short headless screws 54 threaded through the respective outer ends of the terminal straps 48 and projecting into suitable holes in the respective bodies 50 and shoes 52 retains the line terminals 30 to the terminal straps. The bottom portion 21 could be made to extend under the terminals 30, but preferably a pair of insulation members 56 is inserted respectively under the terminals 30 in suitable slots in the walls 35, 36, and 37.

The terminal straps 48 and a pair of arc runners 58 adjacent the stationary contacts 42 are secured in position respectively in the two poles by a plurality of screws 59 extending through the terminal straps and threaded into the arc runners. Thus, the terminal straps are clamped between the bottom portion 21 and the arc runners. In accordance with the invention, a pair of hexagonal or other non-circular recesses is provided in the upper face of the bottom portion 21 respectively beneath the inner ends of the terminal straps 48 and the stationary contacts 42 thereon for the reception of a pair of nuts 60 and adjusting screws 61, the adjusting screws being accessible through a pair of suitable holes 62 leading to a respective pair of the slots 23. The screws 61 bear against the terminal straps 48, and turning of the screws 61 inwardly bends the inner ends of the terminal straps upwardly and thus raises the stationary contacts 42. Thus, in a multipole breaker, adjustment of the stationary contacts can be made to provide substantially equal contact pressures and substantially simultaneous opening of the contacts in the various poles.

Each pole is provided with an arc chute including a plurality of generally U-shaped ferrous plates 64, a pair of side insulating support members 65, and a back insulator 66. One arc chute is disposed between the side wall 35 and intermediate wall 37 and between partition 46 and one of the line terminals 30, and the other arc chute is disposed between the side wall 36 and intermediate wall 37 and between partition 47 and the other of the line terminals 30. The U-shaped metallic plates 64 straddle the respective paths of the movable contacts 44 and are supported in spaced relationship by the support members 65 which may be provided with suitable apertures (not shown) for receiving laterally extending tongues (not shown) on the plates 64. The support members 65 and the back insulator 66 preferably have tongue and slot connections.

For convenience of description, the pole between the side wall 35 and the intermediate wall 37 will be referred to as the first pole, and the pole between the side wall 36 and the intermediate wall 37 will be referred to as the second pole.

The operating handle 24, an over-center spring type actuating mechanism for the crossbar 40 and blades **43*a* and 43*b*, and a releasable trip lever and latching means therefor controlled by the common trip bar 39 are disposed in the first pole, and each pole has a magnetically and thermally responsive means for operating the common trip bar. Thus, a pair of symmetrical support brackets 69 and 70 having respective pairs of bent-over ears 69*a* and 70*a* abutting the bottom portion 21 is secured in the first pole by four screws 71 (FIGURE 3) threaded respectively into the ears 69*a* and 70*a* from the underside of the bottom portion 21. At the ends of the brackets 69 and 70 adjacent the partition 46 the top portions of the brackets are generally U-shaped to provide a pair of tabs 69*b* and 70*b* (FIGURES 9 and 10) extending generally parallel to the main portions of the brackets and supporting a pin 72 on which a trip lever 73 is pivotally mounted between the tabs 69*b* and 70*b*. The main portions of the brackets 69 and 70 extend parallel to and closely adjacent the walls 35 and 37, respectively, and are provided with upwardly facing generally V-shaped notches in the bottom of which the free ends of the leg portions of a generally U-shaped handle arm member 75** are pivotally mounted.

The handle 24 is provided with an enlarged generally arcuately shaped inner end portion 76 recessed to receive the bight portion of the handle arm member 75. The inner end portion 76 extends longitudinally sufficiently to cover the opening 25 in any of the operative positions of the handle 24, and a spring 77 is interposed between the inner end portion 76 and the handle arm member 75 to retain the inner end portion 76 in sealing engagement with the opening 25. At the same time, the cover 22 maintains the inner end portion 76 in operative association with the handle arm member 75 so that the handle 24 and the handle arm member 75 pivot as a unit in the generally V-shaped notches of the brackets 69 and 70.

A mounting pin 78 is pivotally mounted in the brackets 69 and 70, and pivotally mounted on the pin 78 are the blade **43*a*, a pair of overtravel or contact pressure springs 79 of the torsion type, and a carrier 80 which carries the crossbar 40 and a blade actuating pin 81. The carrier 80 and crossbar 40 are best shown in FIGURE 8, the crossbar being secured to the carrier by suitable means such as by swaging the ends of projections (not shown) on the carrier extending through apertures in the crossbar. The carrier 80 is generally U-shaped but has a pair of ears extending from one side of the respective free end portions of the legs and having holes 83 respectively therein for reception of the pin 78 and has a pair of arms extending from the other side of the respective free end portions of the legs and having holes 84 respectively therein for reception of the blade actuating pin 81. The blade 43*a* has a hole 85 (FIGURE 9) therein for reception of the pin 81, and for a purpose to be later described, the hole 85 is larger than the pin 81**, as shown.

The torsion springs 79 are coiled roughly one and a half times around the pin 78 and each has one end secured in a suitable hole in the crossbar 40 and the other end held by a relatively short crosspin 86 (FIGURES 7 and 9) extending through the blade **43*a* on the other side of the mounting pin 78 from the blade actuating pin 81**.

The handle 24 and handle arm member 75 are operatively connected to the pin 81 and blade **43*a* by a toggle mechanism which includes a toggle pin 89, a pair of lower links 87 pivotally connected at one end to the pin 81 and at the other end to the toggle pin 89, a pair of upper links 90 pivotally connected at one end to the toggle pin 89 and at the other end to a pin 91 carried by the trip lever 73, and a pair of tension springs 92 secured at one end to the toggle pin 89 and at the other end to the bight portion of the handle arm member 75. A pair of spacers 88 on the pin 81 respectively maintains the lower ends of the links 87 substantially in engagement with the blade 43*a*** on opposite sides thereof.

Figure 5:
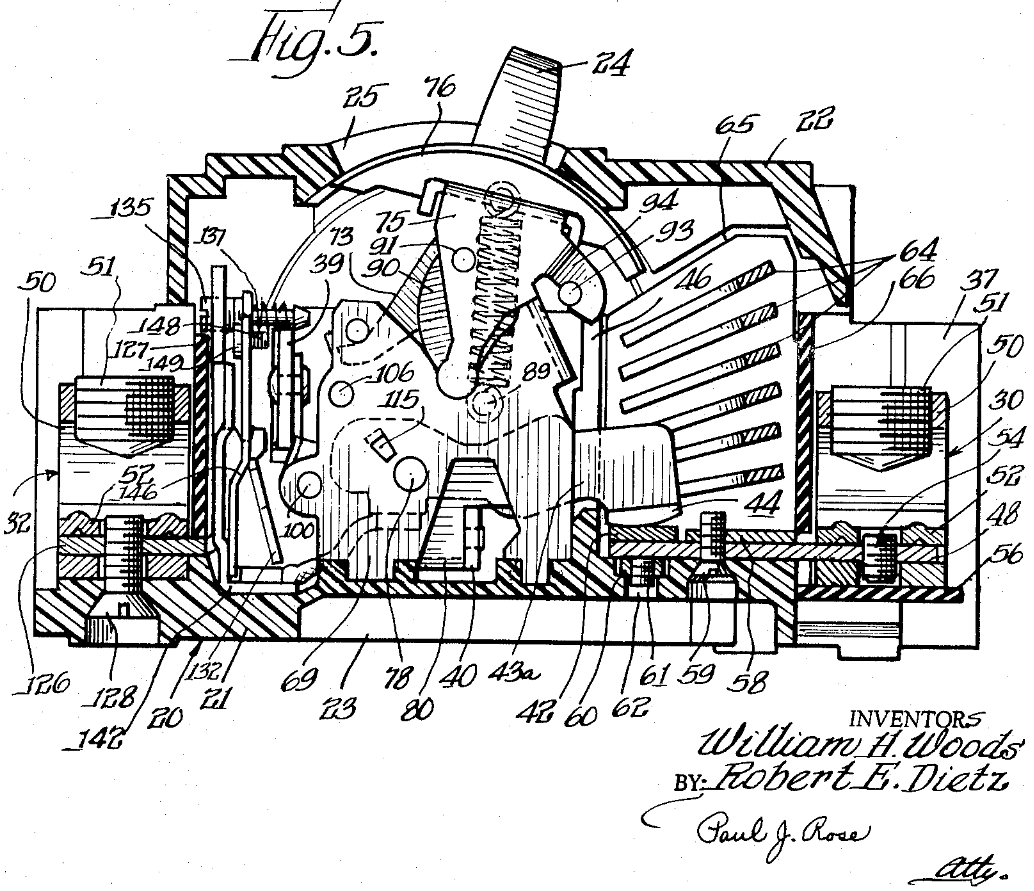
FIGURE 5 is a sectional view taken substantially along line 5—5 of FIGURES 1 and 4, showing the operating mechanism in the "on" position.

The movement of the handle 24 and handle arm member 75 toward "on" position is limited by engagement of the leg portions of the handle arm member with the brackets 69 and 70 as shown in FIGURE 5; the movement toward "off" position is limited by engagement of a pin 93 secured in a pair of projections 94 on the respective leg portions of the handle arm member with a shoulder 95 on the trip lever 73. Further, the movement of the blade **43*a* toward "open" position is limited by engagement of the blade with the tab portions 69*b* and 70*b* of the brackets 69 and 70**.

Figures 12, 13:
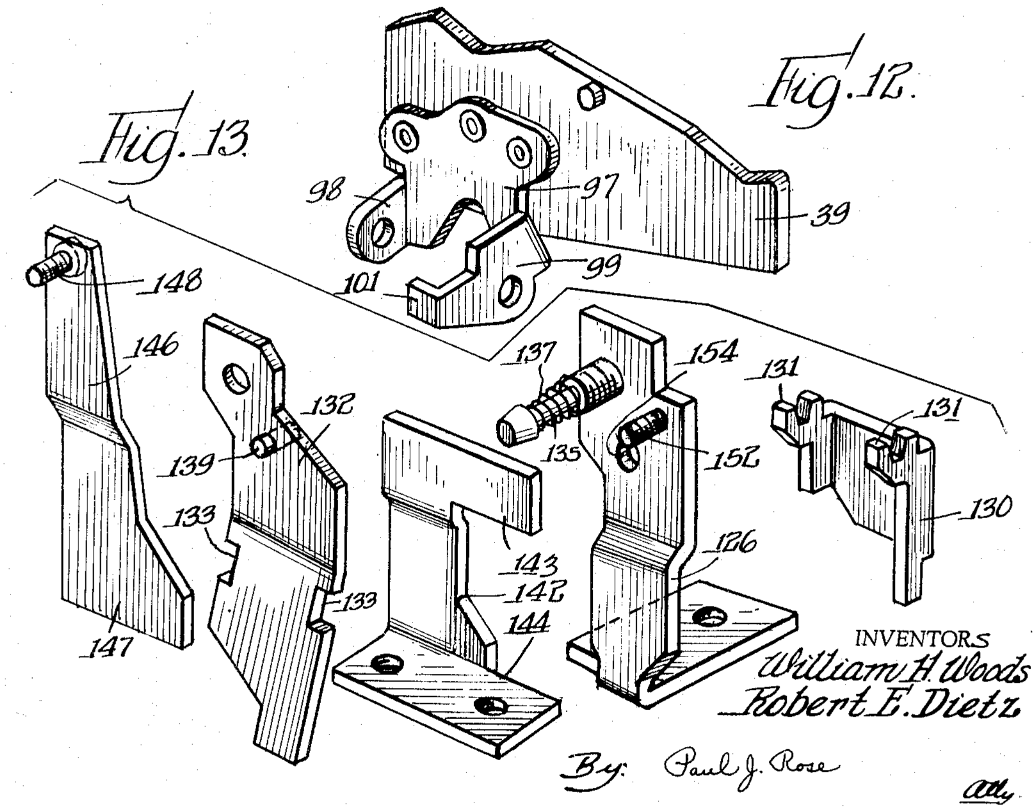
FIGURE 12 is a perspective view of the common trip bar and carrier assembly of the multipole circuit breaker of FIGURE 1.
FIGURE 13 is an exploded view of the parts of the tripping mechanism of one pole of the circuit breaker of FIGURE 1.

The common trip bar 39 is suitably secured as by riveting to a trip bar carrier 97 best shown in FIGURE 12. The carrier 97 includes a pair of opposed leg portions 98 and 99 each of which has a hole therein for the reception of a mounting pin 100 (FIGURES 5 and 9) having opposite ends mounted respectively in the brackets 69 and 70. In addition, the free end portion of the leg 99 is inwardly bent to provide a latch 101 which forms part of a double latch mechanism for the trip lever 73. A spring 102 recessed in the intermediate wall 37 biases the common trip bar 39 and the trip bar carrier 97 including the latch 101 toward latching position (counter-clockwise in FIGURE 9).

A generally U-shaped intermediate latch member 104 is pivotally mounted on a pin 106 extending through the leg portions of the latch member and having opposite ends mounted respectively in the brackets 69 and 70. The bight portion of the intermediate latch member is provided with a generally rectangular aperture 107 for receiving the free end portion of the trip lever 73, as shown best in FIGURES 9 and 10, and a portion of the bight portion is angularly disposed from the remainder to provide a latch surface 108 along an edge of the aperture 107 for cooperation with the trip lever. A torsion spring 110 on the pin 106 has an upper end anchored in a hole 111 in the bracket 70 and a lower end engaging a leg portion 112 of the latch member 104 to bias the latch member 104 counter-clockwise in FIGURE 9 and engage the leg portion 112 with the latch 101 on the carrier 97. The spring 110 properly positions the latch member for relatching with the trip lever 73 during resetting after tripping has occurred due to an overload current. In the tripped or unlatched position of the latch member 104, the spring 110 biases the latch member counter-clockwise as viewed in FIGURE 9 to engage the other leg portion 113 of the latch member with a stop 115 (FIGURE 5) in the form of an inwardly bent tang on the bracket 69.

The movable contact blade **43*b* of the second pole is pivotally mounted on a pin 118 supported in a pair of upwardly extending grooves 119 and 120 in the walls 36 and 37, respectively, of the base 20. The outer end of the pin 118 mounted in the wall 36 is enlarged in diameter to present an annular shoulder for engagement by the blade 43*b*. The portion of the crossbar 40 in the second pole is generally U-shaped as best shown in FIGURE 8 and is resiliently connected to and insulated from the blade 43*b* by means of an overtravel or contact pressure compression spring 121 and a generally U-shaped insulator 122, the insulator 122 embracing the blade as shown best in FIGURE 6 and the spring 121 being interposed between the insulator and an upper leg portion of the crossbar. An arc shield 124 of flexible insulating material is disposed on the blade 43*b***.

Figures 9, 10:
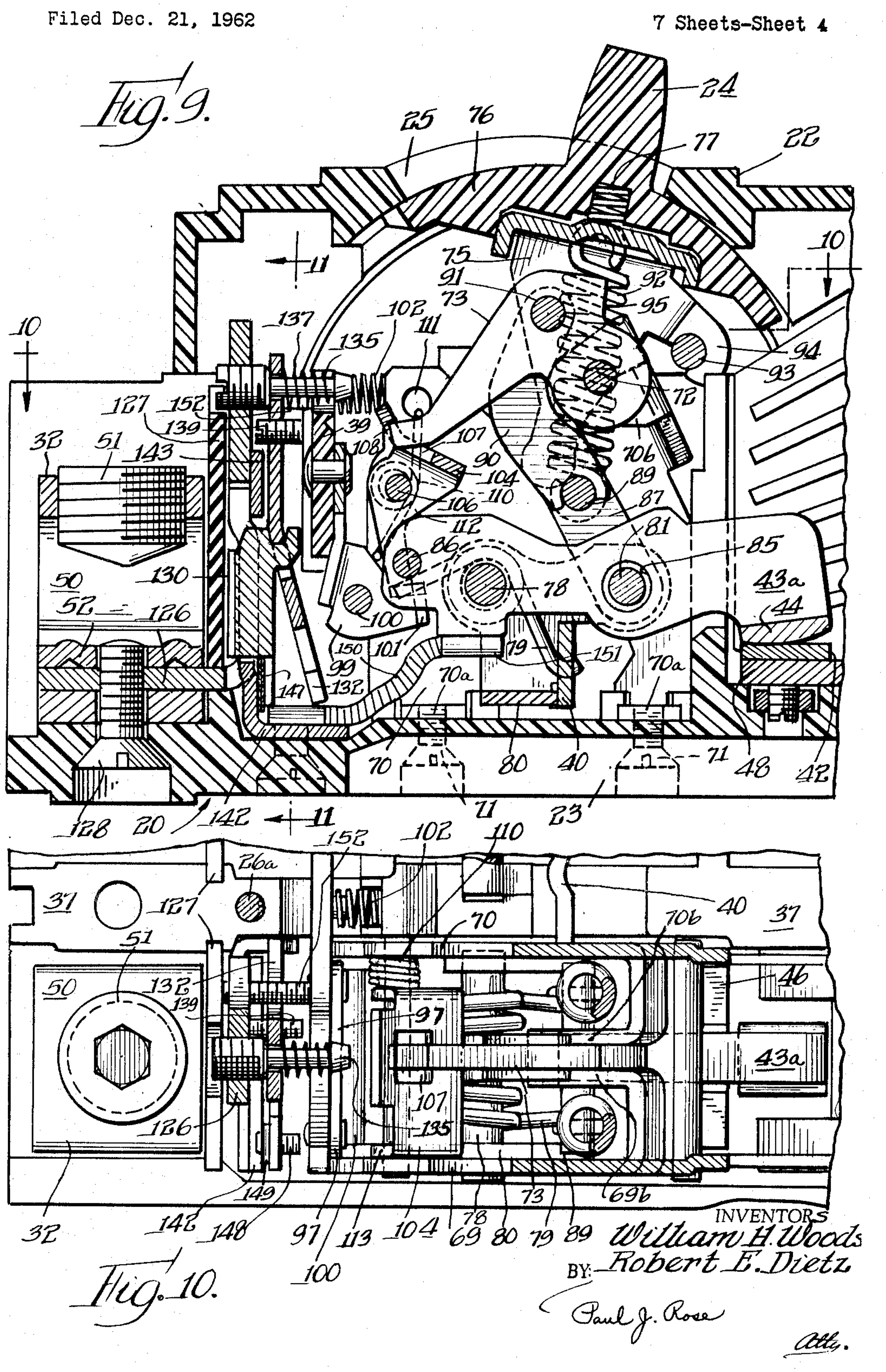
FIGURE 9 is an enlarged fragmentary sectional view taken substantially along the line 9—9 of FIGURE 4.
FIGURE 10 is a view taken substantially along the line 10—10 of FIGURE 9.

The two poles have identical magnetically and thermally responsive tripping means for operating the common trip bar 40. Thus, the load terminals 32 are respectively secured to a pair of generally L-shaped terminal straps 126 by a pair of screws 128 threaded respectively into the terminal straps 126 from the bottom of the base 20 and extending through the bottom portions of the bodies 50 and into the respective shoes 52 as shown in FIGURES 5, 6 and 9. A pair of flat insulating members 127 are disposed adjacent the inner ends of the load terminals 32 in appropriate pairs of slots in the walls 35 and 37, and 36 and 37, respectively. A pair of generally U-shaped magnetic yokes or cores 130 are brazed respectively to the terminal straps 126 on the leg portions thereof extending generally perpendicularly to the bottom portion 21 of the base 20. The shape of the terminal straps 126, cores 130, and other parts of the tripping means is shown best in FIGURE 13. A pair of armature member 132 are pivotally supported respectively on the cores 130, each of which has a pair of upwardly recessed arms 131 cooperable respectively with a pair of notches 133 in opposite sides of an armature member 132. The armature members are formed from flat stock and are bent generally centrally thereof to provide an included angle of approximately 165 degrees.

A pair of adjusting screws 135 is threadedly mounted respectively in the upper end portions of the terminal straps 126. Each screw 135 is provided with a reduced diameter portion extending through an upper end portion of an armature member 132 and having a conically shaped compression return spring 137 monuted thereon and seated at its larger end on the armature member 132 and at its smaller end on an enlarged inner end portion of the screw. The springs 137 bias the armature members counterclockwise in FIGURE 9 about their pivots on the arms 131 of the respective cores 130 to position the lower portions of the armature members away from the cores 130.

The upper portion of each armature member 132 has an actuating screw 139 threadedly mounted therein for engagement with, and actuation of, the common trip bar 39 upon occurrence of a heavy overload current or short circuit condition and consequent attraction of the lower portion of the armature member into engagement with its respective core 130. The actuating screws 139 may be adjusted to compensate for accumulative tolerances in manufacturing and assembly of parts, while the adjusting screws 135 may be turned to vary the air gap between the respective cores 130 and armature members 132 and thus determine the value of overload current at which the tripping devices will operate. It is to be noted that the arrangement of the armature members 132, return springs 137, and air gap adjusting screws 135 is such that adjustment of the screws 135 has substantially no effect on the forces exerted by the respective return springs 137.

A pair of conductive heater straps 142 is provided for association respectively with a pair of bimetal strips 146 forming the thermally responsive portions of the tripping mechanisms for the respective poles. The heater straps 142 are shaped as best shown in FIGURE 13 and include offsetting leg portions 143 brazed to the respective terminal straps 126 on the opposite sides thereof from the cores 130 and above the arms 131 thereof and also include base portions 144 respectively secured to the bottom portion 21 of the base 20 by pairs of screws 145 (FIGURES 3 and 11). The base portions 144 are electrically connected to the blades 43*a* and 43*b*, respectively, by a plurality of braided wires 150 wrapped in metal strips 151 at opposite ends and brazed to the base portions 144 and the contact blades. The bimetal strips 146 are shaped as best shown in FIGURE 13 and are brazed at their relatively wide lower end portions 147 to the respective heater straps 142 adjacent the base portions 144. The upper end portion of each bimetal strip 146 is provided with a nut 149 brazed thereto and threadedly receiving an actuating screw 148 engageable with the common trip bar 39 for tripping thereof upon persistent moderate overload currents.

The terminal strap 126 for the first pole is provided with an adjustable stop screw 152 threadedly received in the upper end portion of the terminal strap and spaced from the respective air gap adjusting screw 135. The stop screw 152 limits the return movement of the common trip bar 39 upon resetting of the tripping mechanism and thereby determines the extent of overlap between the leg portion 112 of the latch member 104 and the latch 101 of the trip bar carrier 97 and between the trip lever 73 and the latch surface 108 on the latch member 104. The terminal strap 126 for the second pole has no stop screw 152. Each terminal strap 126 is provided with a hole 154 providing accesss to the respective actuating screw 139.

An electrical circuit may be traced through the first pole from the shoe 52 of the respective line terminal 30, through the respective terminal strap 48, stationary contact 42, movable contact 44, blade 43*a*, braided wires 150, heater strap 142, terminal strap 126, and the shoe 52 of the respective load terminal 32. A similar electrical circuit may be traced through the second pole.

Figure 14:
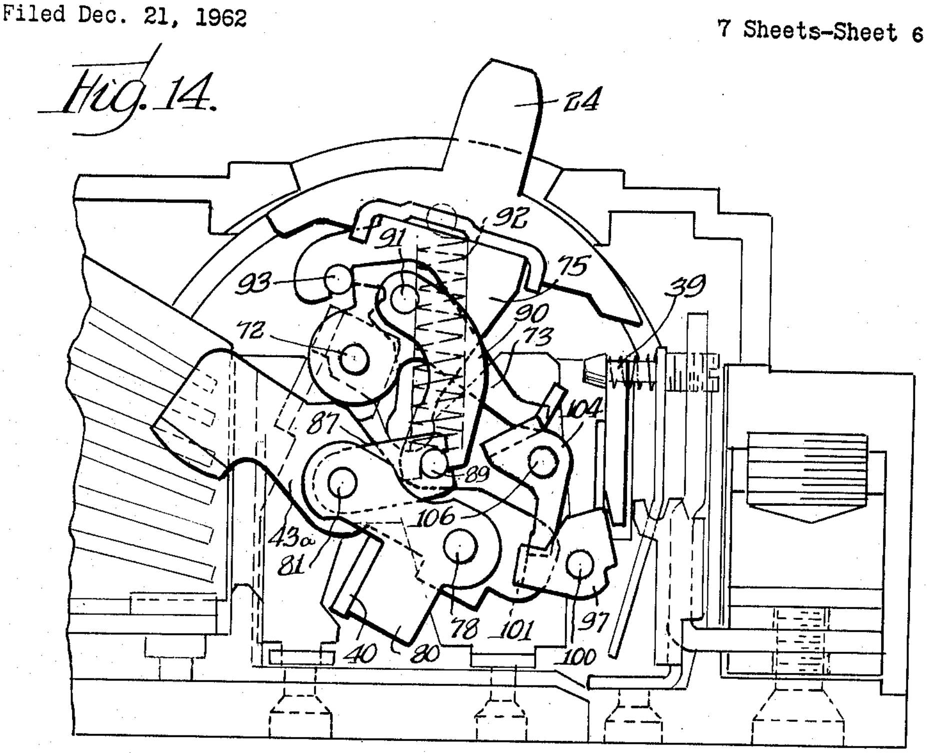
FIGURES 14, 15, 16, and 17 are schematic views of the operating mechanism for the movable contact blade of the circuit breaker of FIGURE 1, showing the relative positions of the parts in "off," "on," "reset" and "tripped" positions, respectively.
Figure 15:
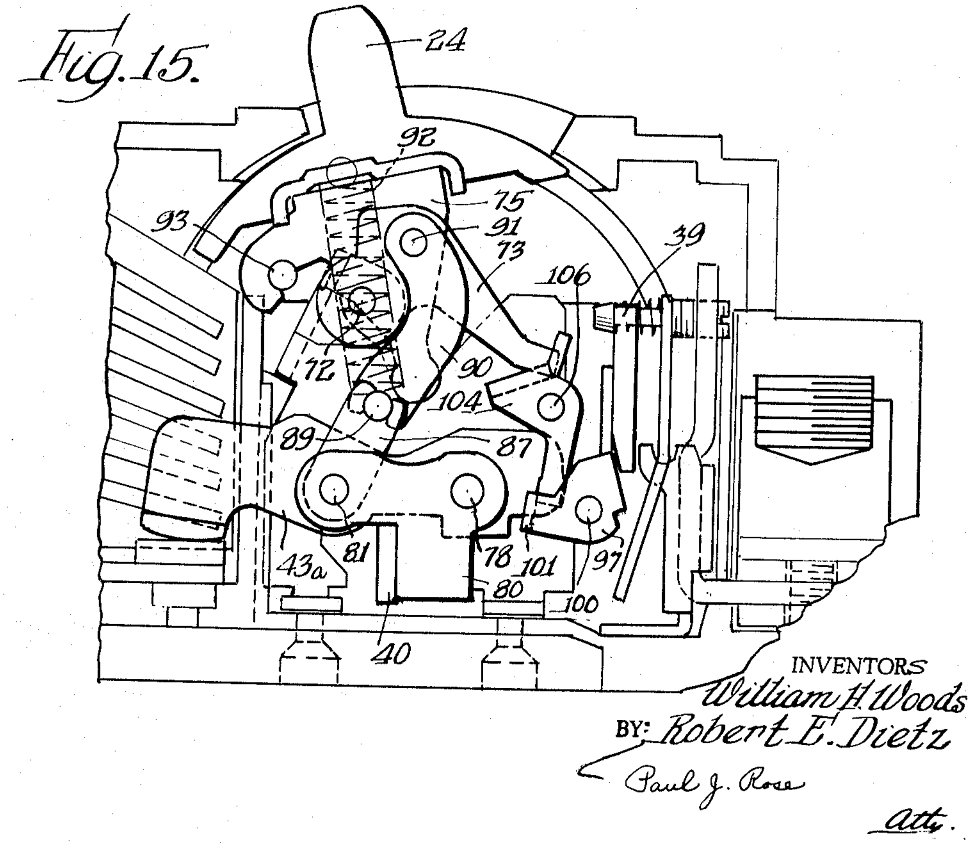

FIGURES 14–17 show the parts of the operating mechanism in the first pole in various positions, the "manually off" position being shown in FIGURE 14 and the "on" position in FIGURE 15. In both of these positions, the springs 92 exert an upward force on the toggle pin 89 and upper links 90 tending to rotate the pin 91 and trip lever 73 counter-clockwise in FIGURES 14 and 15, but the trip lever is latched by the latch member 104 and latch 101 on the trip bar carrier 97. Thus, the pin 91 can be considered to be stationary for purposes of discussion of FIGURES 14 and 15.

In the "on" position of FIGURE 15, the springs 92 tend to rotate the toggle pin 89 clockwise about the pin 91. When the handle 24 is moved to the right from the "on" position to the "off" position of FIGURE 14, the line of action of the springs 92 is shifted to the right across the pin 91 and the springs rotate the toggle pin 89 counter-clockwise about the pin 91, shifting the links 87 and 90 and pivoting the pin 81, blade 43*a*, and carrier 80 clockwise about the pin 78 to the "off" position in which the blade 43*a* engages the tabs 69*b* and 70*b* and the pin 93 engages the trip lever 73. At the same time, the blade 43*b* in the second pole is pivoted about the pin 118 to "off" position by the crossbar 40.

When the handle 24 is moved to the left from the "off" position of FIGURE 14 to the "on" position of FIGURE 15, the line of action of the springs 92 is shifted to the left across the pin 91 and the springs rotate the toggle pin 89 clockwise about the pin 91, shifting the links 87 and 90 and pivoting the pin 81, blade 43*a*, and carrier 80 counter-clockwise about the pin 78 to the "on" position, in which the upper links 90 respectively engage the tabs 69*b* and 70*b* and the handle arm member 75 engages the brackets 69 and 70. At the same time, the blade 43*b* in the second pole is pivoted about the pin 118 to "on" position by the cross-bar 40. In order to insure contact pressure, the movable contacts 44 in both poles engage the respective stationary contacts 42 slightly before the links 90 engage the respective tabs 69*b* and 70*b*. The engagement of the contacts stops the motion of the blades 43*a* and 43*b*, but the movement of the links 87 and 90, pin 81, carrier 80 and crossbar 40 continues until the links 90 engage the tabs 69*b* and 70*b*, the pin 81 moving out of contact with the upper edge of the hole 85 (see FIGURE 9) in the blade 43*a* and slightly pivoting the carrier 80 and crossbar 40 after the contacts 44 have engaged their respective stationary contacts 42. This last pivotal movement of the crossbar 40 establishes pressure between the respective pairs of contacts in both poles, in the first pole by means of the torsion springs 79 and pin 86, and in the second pole by means of the compression spring 121 and insulator 122.

Figure 17:
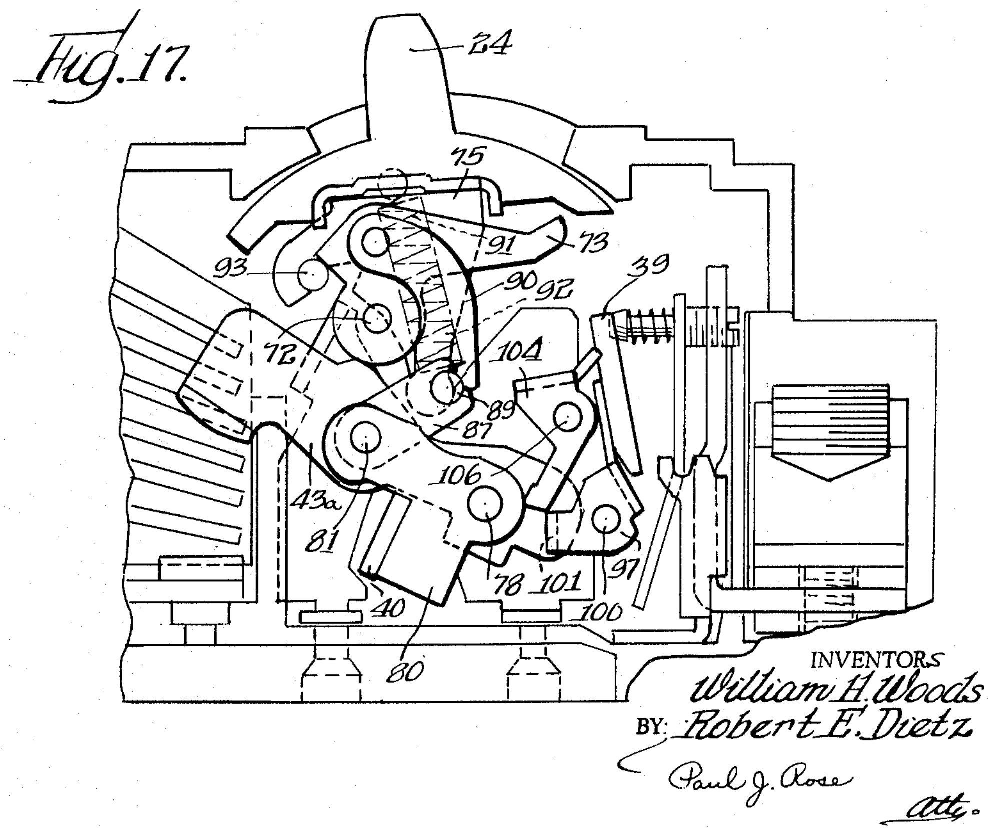

The "tripped" position of the operating mechanism in the first pole is shown in FIGURE 17. Upon the occurrence of a heavy overload current or short circuit condition in the circuit of either pole, the respective core 130 will attract the lower portion of its respective armature 132, pivoting the upper portion of the armature and forcing the actuating screw 139 carried thereby against the trip bar 39. Also, upon occurrence of a persistent moderate overload current in the circuit of either pole, the respective bimetal strip 146 will flex, forcing the actuating screw 148 carried thereby against the trip bar 39. The trip bar 39, carrier 97, and the latch 101 thereon may thus be pivoted by any of four screws from the positions thereof shown in FIGURE 15 counter-clockwise about the pin 100 to the positions shown in FIGURE 17, releasing the latch member 104 from the latch 101 and allowing the latch member 104 to pivot clockwise to the position shown in FIGURE 17, thereby releasing the trip lever 73. The latch member 104 pivots under the influence of both the spring 110 and the trip lever 73. Upon release from the latch member 104, the trip lever pivots about the pin 72, under the influence of the springs 92 acting through the toggle pin 89, links 90, and pin 91, counter-clockwise from the position shown in FIGURE 15 to the position shown in FIGURE 17. The pin 91 is thus carried across the line of action of the springs 92, from the right thereof in FIGURE 15 to the left thereof in FIGURE 17, and the springs 92 then pivot the toggle pin 89 counter-clockwise about the pin 91, shifting the links 87 and 90 and pivoting the pin 81, blade 43*a*, and carrier 80 clockwise about the pin 78 while the crossbar 40 pivots the blade 43*b* in the second pole about the pin 118, to disengage the contacts 44 from the respective stationary contacts 42. The rotation of the toggle pin 89 counter-clockwise about the pin 72 results in a shifting of the line of action of the springs 92 across the pivotal axis of the handle arm 75, whereupon the springs 92 pivot the handle 24 to a "tripped" position.

Figure 16:
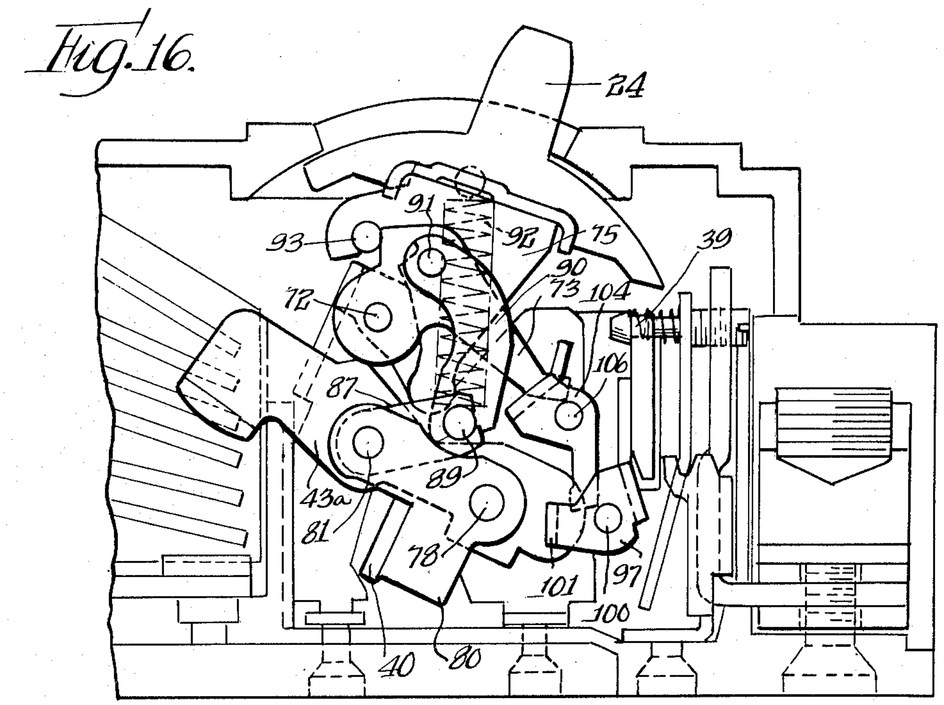

The "reset" position of the operating mechanism in the first pole is shown in FIGURE 16. Movement of the handle 24 to the right from the "tripped" position of FIGURE 17 to the position of FIGURE 16 causes the pin 93 in the handle arm 75 to pivot the trip lever 73 clockwise. The latch member 104 is positioned by the spring 110 in a manner such that during the resetting operation the trip lever pivots into the aperture 107 of the latch member and rotates the latch member counter-clockwise from the position shown in FIGURE 17 to the position shown in FIGURE 16. The trip bar 39 and carrier 97 are then free to be returned to normal position by the spring 102. Release of the handle 24 then restores all the parts to their "manually off" positions of FIGURE 14, the handle 24 moving slightly to the left, the trip lever 73 rotating slightly counter-clockwise into engagement with the latch surface 108 of the latch member 104, and the latch member 104 being rotated slightly clockwise by the spring 110 to engage the leg 112 with the latch 101 on the trip bar carrier 97.

It will be seen that a circuit breaker has been provided in which the overtravel springs 79 and 121 are located closely adjacent the respective pins 78 and 118 to reduce the effective mass at the outer end portions of the blades in comparison with former constructions and thus reduce impact force and contact bounce.

It should also be noted that if the contacts in either pole should become welded together, the handle 24 will remain in "on" position and return to "on" position if moved to "off" position and released, thus always giving a true indication of the condition of the contacts. This is so, because if a pair of contacts is welded together, the contact blade 43*a* is fixed, and movement of the handle 24 from the "on" position of FIGURE 15 toward "off" position to shift the line of action of the springs 92 across the pin 91 will not move the toggle pin 89 across the pivotal axis of the handle arm 75, and upon release of the handle, the springs 92 will return it to "on" position. Similarly, if a pair of contacts is welded together and the trip lever 73 is released, the lower links 87 and upper links 90 will restrain the trip lever and the handle 24 will remain in "on" position.

Further, a circuit breaker has been provided having a novel and inexpensive provision for adjusting the stationary contacts, and having a magnetically responsive tripping mechanism in which adjustment of the air gap between the armature and core does not materially change the effective length and force of the armature return spring.

In addition, a circuit breaker has been provided having an improved double latching means for the trip lever in which an intermediate latch member is provided between the common trip bar and trip lever, the double latching serving to greatly reduce the pressure at the latching surfaces which must be overcome by the magnetically and thermally responsive portions of the tripping mechanism.

Also, a multipole circuit breaker having a more rigid and less expensive crossbar has been provided.

Various modifications may be made in the structure shown and described without departing from the spirit and scope of the invention.

We claim:

1. An electrical circuit breaker comprising
(a) an insulating case having a base wall portion,
(b) a terminal strap secured with respect to said base wall portion and having a portion extending generally perpendicularly to said base wall portion,
(c) a generally U-shaped magnetic core member having a bight portion secured to one side of said terminal strap portion adjacent the end thereof closer to said base wall portion and having a pair of arms extending beyond the other side of said terminal strap portion generally centrally thereof,
(d) an armature member pivotally mounted centrally thereof on said pair of arms, said armature member being generally flat but bent centrally thereof to provide first and second portions extending obtusely to each other,
(e) an air gap adjusting screw threadedly mounted in said terminal strap portion adjacent the end thereof remote from said base wall portion, said air gap adjusting screw extending generally perpendicularly away from said other side of said terminal strap portion through an end portion of said first portion of said armature member remote from said second portion thereof, said air gap adjusting screw having a reduced diameter portion between the ends thereof providing a pair of opposed shoulders,
(f) a compression spring mounted on said reduced diameter portion of said air gap adjusting screw and seated on one of said shoulders remote from said terminal strap portion and normally biasing said first portion of said armature member into engagement with the other of said shoulders adjacent said terminal strap portion to space said second portion of said armature member from said core member and provide an air gap therebetween, and
(g) a trip bar actuating screw threadedly mounted in said first portion of said armature member, said core member being adapted to attract said second portion of said armature member to close said air gap and pivot said armature member on said arms upon occurrence of a predetermined electrical current in said terminal strap portion, and said air gap adjusting screw being adjustable to vary said air gap and said predetermined electrical current without substantially changing the effective force of said compression spring on said first portion of said armature member.

2. An electrical circuit breaker comprising
(a) an insulating case,
(b) a stationary contact secured in said case,
(c) a substantially rigid generally flat elongated movable contact blade mounted in said case for edgewise pivotal movement between ON and OFF positions,
(d) a movable contact mounted on an end portion of said movable contact blade and engaging said stationary contact in said ON position of said movable contact blade,
(e) an actuating pin carrier mounted in said case for pivotal movement about an axis coaxial with the pivotal axis of said movable contact blade,
(f) an actuating pin in said case carried by said actuating pin carrier for pivotal movement therewith and extending transversely of said movable contact blade in spaced relationship thereto when said movable contact blade is in said ON position and adapted to engage said movable contact blade between the pivotal axis thereof and said movable contact prior to moving said movable contact blade toward said OFF position,
(g) a torsion overtravel spring mounted in said case generally coaxially of the pivotal axis of said movable contact blade and having one of its end portions secured with respect to an end portion of said movable contact blade on the other side of the pivotal axis thereof from said movable contact and having its other end portion secured with respect to said actuating pin carrier, and (h) a pivotable operating handle extending outwardly of said case and operatively connected to said actuating pin for pivotally moving said actuating pin in opposite directions about the pivotal axis of said movable contact blade between a predetermined first extreme position and a predetermined second extreme position, movement of said actuating pin from said first extreme position to said second extreme position causing said actuating pin first to move into engagement with said movable contact blade and then to pivot said movable contact blade toward said OFF position to disengage said movable contact from said stationary contact, and movement of said actuating pin from said second extreme position to said first extreme position causing said actuating pin first to pivot said actuating pin carrier to thereby pivot said torsion overtravel spring and in turn thereby pivot said movable contact blade toward said ON position to engage said movable contact with said stationary contact and then to move out of engagement with said movable contact blade and further pivot said actuating pin carrier to thereby stress said torsion overtravel spring to apply a torque to said movable contact blade and thus create pressure between said movable contact and said stationary contact.

3. A multipole electrical circuit breaker comprising a plurality of substantially rigid generally flat elongated movable contact blades mounted in respective poles for edgewise pivotal movement about a common axis, and a crossbar operatively connected to said contact blades and tying said contact blades together for operation as a unit, said crossbar comprising a generally flat metal member having a substantially straight elongated portion in a first of said poles secured to operating mechanism for the respective contact blade in said first pole and a generally U-shaped portion in a second of said poles operatively connected to and insulated from the respective contact blade in said second pole, the general plane of said crossbar being substantially perpendicular to the longitudinal axes of said contact blades whereby any bending stresses likely to be undergone by said crossbar in the operation of said circuit breaker will be applied generally edgewise thereof.

4. A multipole electrical circuit breaker comprising (a) an insulating case having at least two compartments therein for respectively housing two poles of said multipole circuit breaker, (b) a first stationary contact secured in one of said compartments, (c) a first substantially rigid generally flat elongated movable contact blade mounted in said one compartment for edgewise pivotal movement between ON and OFF positions, (d) a first movable contact mounted on an end portion of said first movable contact blade and engaging first stationary contact in said ON position of said first movable contact blade, (e) an actuating pin carrier mounted in said one compartment for pivotal movement about an axis coaxial with the pivotal axis of said first movable contact blade, (f) an actuating pin in said one compartment carried by said actuating pin carrier for pivotal movement therewith and extending transversely of said first movable contact blade and being operatively connected to said first movable contact blade between the pivotal axis thereof and said first movable contact, (g) a torsion overtravel spring mounted in said one compartment generally coaxially of the pivotal axis of said first movable contact blade and having one of its end portions secured with respect to an end portion of said first movable contact blade on the other side of the pivotal axis thereof from said first movable contact and having its other end portion secured with respect to said actuating pin carrier, (h) a pivotable operating handle extending outwardly of said one compartment and operatively connected to said actuating pin for pivotally moving said actuating pin in opposite directions about the pivotal axis of said first movable contact blade between two predetermined positions, (i) a second stationary contact secured in a second of said compartments, (j) a second substantially rigid generally flat elongated movable contact blade mounted in said second compartment for edgewise pivotal movement between ON and OFF positions about an axis coaxial with the pivotal axis of said first movable contact blade, (k) a second movable contact mounted on an end portion of said second movable contact blade and engaging said second stationary contact in said ON position of said second movable contact blade, (l) a generally U-shaped insulator mounted on said second movable contact blade between the pivotal axis thereof and said second movable contact and having a pair of leg portions straddling and engaging said second movable contact blade and a bight portion extending along the side of said second movable contact blade adjacent said first movable contact blade, (m) a generally flat metal crossbar having a substantially straight elongated portion secured to said actuating pin carrier and a generally U-shaped portion enbracing said insulator, the general plane of said crossbar being substantially perpendicular to the longitudinal axes of said contact blades, and (n) a compression overtravel spring disposed between one of the leg portions of said insulator and a leg portion of said generally U-shaped portion of said crossbar.

5. A multipole electrical circuit breaker as claimed in claim 4, including a flexible arc shield of insulating material mounted on said second contact blade between said second movable contact and said U-shaped insulator.

6. An electrical circuit breaker comprising (a) an insulating case, (b) a stationary contact secured in said case, (c) a substantially rigid generally flat elongated movable contact blade mounted in said case for edgewise pivotal movement between ON and OFF positions, (d) a movable contact mounted on an end portion of said movable contact blade and engaging said stationary contact in said ON position of said movable contact blade, (e) an actuating pin carrier mounted in said case for pivotal movement about an axis coaxial with the pivotal axis of said movable contact blade, (f) an actuating pin in said case carried by said actuating pin carrier for pivotal movement therewith and extending transversely of said movable contact blade in spaced relationship thereto when said movable contact blade is in said ON position and adapted to engage said movable contact blade between the pivotal axis thereof and said movable contact prior to moving said movable contact blade toward said OFF position, (g) a torsion overtravel spring mounted in said case generally coaxially of the pivotal axis of said movable contact blade and having one of its end portions secured with respect to an end portion of said movable contact blade on the other side of the pivotal axis thereof from said movable contact and having its other end portion secured with respect to said actuating pin carrier, (h) a pivotable operating handle extending outwardly of said case and opperatively connected to said actuating pin for pivotally moving said actuating pin in opposite directions about the pivotal axis of said movable contact blade to pivot said movable contact blade selectively toward said ON and OFF positions respectively to move said movable contact into and out of engagement with said stationary contact, (i) a releasably latched trip lever mounted in said case for pivotal movement about an axis disposed between said stationary contact and the pivotal axis of said movable contact blade and operatively connected to said actuating pin, (j) a trip bar carrier mounted in said case for pivotal movement about an axis disposed on the other side of the pivotal axis of said movable contact blade from the pivotal axis of said trip lever, (k) a trip bar secured to said trip bar carrier, (l) current responsive tripping means secured in said case on the other side of said trip bar from said trip lever and operable upon overload current flow therethrough to pivot sad trip bar and trip bar carrier, and (m) a double latch mechanism for said trip lever including a latch portion on said trip bar carrier and an intermediate ltach member mounted in said case for pivotal movement about an axis disposed between the pivotal axes of said trip bar carrier and said trip lever, said intermediate latch member having a portion releasably latched by said latch portion of said trip bar carrier and having a latching surface releasably latching said trip lever, said portion latched by said latch portion of said trip bar carrier and said latching surface latching said trip lever being on substantially diametrically opposite sides of the pivotal axis of said intermediate latch member.

7. In an electrical device, (a) a core member magnetizable upon flow of electrical current through said device, (b) an armature member having a portion spaced from said core member to provide an air gap therebetween and adapted to be attracted into engagement with said core member upon flow of a predetermined electrical current through said device, (c) a threadedly mounted air gap adjusting screw having a pair of opposed shoulders disposed on opposite sides of said armature member, and (d) a spring mounted on said air gap adjusting screw between said armature member and one of said shoulders and biasing said portion of said armature member away from said core member, said air gap adjusting screw being adjustable to vary said air gap and said predetermined electrical current without substantially changing the effective force of said spring on said portion of said armature member.

8. An electrical circuit breaker comprising (a) an insulating case (b) a stationary contact secured in said case, (c) a substantially rigid generally flat elongated movable contact blade mounted in said case for edgewise pivotal movement between ON and OFF positions, (d) a movable contact mounted on an end portion of said movable contact blade and engaging said stationary contact in said ON position of said movable contact blade, (e) an actuating pin carrier mounted in said case for pivotal movement about an axis coaxial with the pivotal axis of said movable contact blade, (f) an actuating pin in said case carried by said actuating pin carrier for pivotal movement therewith and extending transversely of said movable contact blade in spaced relationship thereto when said movable contact blade is in said ON position and adapted to engage said movable contact blade between the pivotal axis thereof and said movable contact prior to moving said movable contact blade toward said OFF position, (g) a torsion overtravel spring mounted in said case generally coaxially of the pivotal axis of said movable contact blade and having one of its end portions secured with respect to an end portion of said movable contact blade on the other side of the pivotal axis thereof from said movable contact and having its other end portion secured with respect to said actuating pin carrier, (h) a trip lever mounted in said case for pivotal movement about an axis disposed between said stationary contact and the pivotal axis of said movable contact blade and having a releasably latched end portion on the other side of the pivotal axis of said trip lever from said stationary contact, (i) a first link in said case having one end portion pivotally connected to said actuating pin, (j) a second link in said case having one end portion pivotally connected to said trip lever between the pivotal axis thereof and said releasably latched end portion, (k) a toggle pin in said case carried by the other end portions of said first and second links, (l) an operating handle extending outwardly of said case and mounted for pivotal movement about an axis disposed between the pivotal axes of said trip lever and said movable contact blade, and (m) a tension spring having one end connected to said operating handle and the other end connected to said toggle pin.

9. An electrical circuit breaker comprising (a) an insulating case, (b) a stationary contact secured in said case, (c) substantially rigid generally flat elongated movable contact blade mounted in said case for edgewise pivotal movement between ON and OFF positions, (d) a movable contact mounted on an end portion of said movable contact blade and engaging said stationary contact in said ON position of said movable contact blade, (e) an actuating pin carrier mounted in said case for pivotal movement about an axis coaxial with the pivotal axis of said movable contact blade, (f) an actuating pin in said case carried by said actuating pin carrier for pivotal movement therewith and extending transversely of said movable contact blade in spaced relationship thereto when said movable contact blade is in said ON position and adapted to engage said movable contact blade between the pivotal axis thereof and said movable contact prior to moving said movable contact blade toward said OFF position, (g) a torsion overtravel spring mounted in said case generally coaxially of the pivotal axis of said movable contact blade and having one of its end portions secured with respect to an end portion of said movable contact blade on the other side of the pivotal axis thereof from said movable contact and having its other end portion secured with respect to said actuating pin carrier, (h) a trip lever mounted in said case for pivotal movement about an axis disposed between said stationary contact and the pivotal axis of said movable contact blade and having a releasably latched end portion on the other side of the pivotal axis of said trip lever from said stationary contact.

(i) a first link in said case having one end portion pivotally connected to said actuating pin, (j) a second link in said case having one end portion pivotally connected to said trip lever between the pivotal axis thereof and said releasably latched end portion, (k) a toggle pin in said case carried by the other end portions of said first and second links, (l) an operating handle extending outwardly of said case and mounted for pivotal movement about an axis disposed between the pivotal axes of said trip lever and said movable contact blade, (m) a tension spring having one end connected to said operating handle and the other end connected to said toggle pin, (n) a trip bar carrier mounted in said case for pivotal movement about an axis disposed on the other side of the pivotal axis of said movable contact blade from the pivotal axis of said trip lever, (o) a trip bar secured to said trip bar carrier, (p) current responsive tripping means secured in said case on the other side of said trip bar from said trip lever and operable upon overload current flow therethrough to pivot said trip bar and trip bar carrier, and (q) a double latch mechanism for said trip lever including a latch portion on said trip bar carrier and an intermediate latch member mounted in said case for pivotal movement about an axis disposed between the pivotal axes of said trip bar carrier and said trip lever, said intermediate latch member having a portion releasably latched by said latch portion of said trip bar carrier and having a latching surface releasably latching said trip lever, said portion latched by said latch portion of said trip bar carrier and said latching surface latching said trip lever being on substantially diametrically opposite sides of the pivotal axis of said intermediate latch member.

10. A multipole electrical circuit breaker comprising (a) an insulating case having at least two compartments therein for respectively housing two poles of said multipole circuit breaker, (b) a first stationary contact secured in one of said compartments, (c) a first substantially rigid generally flat elongated movable contact blade mounted in said one compartment for edgewise pivotal movement between ON and OFF positions, (d) a first movable contact mounted on an end portion of said first movable contact blade and engaging said first stationary contact in said ON position of said first movable contact blade, (e) an actuating pin carrier pivotally mounted in said one compartment, (f) an actuating pin in said one compartment carried by said actuating pin carrier for pivotal movement therewith, said actuating pin extending transversely of said first movable contact blade and being operatively connected thereto between the pivotal axis thereof and said first movable contact, (g) a torsion overtravel spring mounted in said one compartment generally coaxially of the pivotal axis of said first movable contact blade and having one of its end portions secured with respect to an end portion of said first movable contact blade on the other side of the pivotal axis thereof from said first movable contact and having its other end portion secured with respect to said actuating pin carrier, (h) a trip lever mounted in said one compartment for pivotal movement about an axis disposed between said first stationary contact and the pivotal axis of said first movable contact blade and having a releasably latched end portion on the other side of the pivotal axis of said trip lever from said first stationary contact, (i) A trip bar carrier mounted in said one compartment for pivotal movement about an axis disposed on the other side of the pivotal axis of said first movable contact blade from the pivotal axis of said trip lever, (j) a trip bar secured to said trip bar carrier in said one compartment and extending into a second of said compartments, (k) a double latch mechanism for said trip lever including a latch portion on said trip bar carrier and an intermediate latch member mounted in said one compartment for pivotal movement about an axis disposed between the pivotal axes of said trip bar carrier and said trip lever, said intermediate latch member having a portion on one side of its pivotal axis releasably latched by said latch portion of said trip bar carrier and having a latching surface on the other side of its pivotal axis releasably latching said trip lever, (l) a first link in said one compartment having one end portion pivotally connected to said actuating pin, (m) a second link in said one compartment having one end portion pivotally connected to said trip lever between the pivotal axis thereof and said releasably latched end portion, (n) a toggle pin in said one compartment carried by the other end portions of said first and second links, (o)) an operating handle extending outwardly of said one compartment and mounted for pivotal movement about an axis disposed between the pivotal axes of said trip lever and said first movable contact blade, (p) a tension spring in said one compartment having one end connected to said operating handle and the other end connected to said toggle pin, (q) a second stationary contact secured in said second compartment, (r) a second substantially rigid generally flat elongated movable contact blade mounted in said second compartment for edgewise pivotal movement between ON and OFF positions about an axis coaxial with the pivotal axis of said first movable contact blade, (s) a second movable contact mounted on an end portion of said second movable contact blade and engaging said second stationary contact in said ON position of said second movable contact blade, (t) a generally flat metal crossbar having a portion in said one compartment secured to said actuating pin carrier and a generally U-shaped portion in said second compartment operatively connected to and insulated from said second movable contact blade, the general plane of said crossbar being substantially perpendicular to the longitudinal axes of said contact blades whereby any bending stresses likely to be undergone by said crossbar in the operation of said circuit breaker will be applied generally edgewise thereof, (u) a compression overtravel spring disposed in said second compartment and operatively connected between said generally U-shaped portion of said crossbar and said second movable contact blade, (v) a pair of electrically conductive strap members secured respectively in said first and second compartments adjacent said trip bar on the other side thereof from said trip bar carrier, (w) a pair of generally U-shaped magnetic core members disposed respectively in said first and second compartments in electromagnetic relationship respectively with said strap members, each of said core members having a bight portion on the other side of its respective strap member from said trip bar and a pair of leg portions extending from said bight portion toward said trip bar, (x) a pair of elongated armature members disposed respectively in said first and second compartments in electromagnetic relationship respectively with said core members, each of said armature members being pivotally mounted centrally thereof on the leg portions of its respective core member on the other side of its respective strap member from the bight portion of its respective core member and being generally flat but bent centrally thereof to provide first and second portions extending obtusely from each other, the first portion of each of said armature members being operatively engageable with said trip bar and the second portion of each of said armature members exclusive of its pivotal mounting being normally spaced from the leg portions of its respective core member to provide an air gap therebetween, (y) a pair of air gap adjusting screws threadedly mounted respectively in said strap members in spaced relationship respectively to said core members, each of said air gap adjusting screws having a pair of opposed shoulders thereon disposed on the side of its respective strap member adjacent said trip bar, and (z) a pair of armature-biasing compression springs respectively mounted on said air gap adjusting screws, each of said armature-biasing compression springs being seated on the shoulder of its respective air gap adjusting screw facing its respective strap member and biasing the first portion of its respective armature member toward the other shoulder of its respective air gap adjusting screw to normally maintain said air gap between the second portion of its respective armature member and the respective core member, each of said core members being adapted to attract the second portion of its respective armature member to close the respective air gap and pivot the respective armature member and thereby pivot said trip bar upon the occurrence of a predetermined electrical current in its respective strap member, and each of said air gap adjusting screws being adjustable to vary the respective air gap without substantially changing the effective force of the respective armature-biasing compression spring on the first portion of the respective armature member.

References Cited by the Examiner

UNITED STATES PATENTS

| | | | |
|---|---|---|---|
| 2,677,028 | 4/1954 | Cannon et al. | 200—166 |
| 2,989,604 | 6/1961 | Wegh | 200—88 |
| 2,989,606 | 6/1961 | Walker et al. | 200—88 |

FOREIGN PATENTS

| | | |
|---|---|---|
| 421,796 | 10/1933 | Great Britain. |

BERNARD A. GILHEANY, *Primary Examiner.*

ROBERT K. SCHAEFER, *Examiner.*